(12) United States Patent
Moran et al.

(10) Patent No.: US 10,580,014 B2
(45) Date of Patent: Mar. 3, 2020

(54) SYSTEM AND METHOD FOR PAYMENT CARD INDUSTRY COMPLIANCE

(71) Applicant: Avaya Inc., Santa Clara, CA (US)

(72) Inventors: Thomas J. Moran, Co. Galway (IE); Gerard Carty, Co. Galway (IE)

(73) Assignee: Avaya Inc., Santa Clara, CA (US)

(*) Notice: Subject to any disclaimer, the term of this patent is extended or adjusted under 35 U.S.C. 154(b) by 747 days.

(21) Appl. No.: 14/302,643

(22) Filed: Jun. 12, 2014

(65) Prior Publication Data
US 2015/0363789 A1 Dec. 17, 2015

(51) Int. Cl.
*G06Q 30/00* (2012.01)
*H04M 3/51* (2006.01)

(52) U.S. Cl.
CPC ......... *G06Q 30/018* (2013.01); *G06Q 30/016* (2013.01); *H04M 3/5175* (2013.01)

(58) Field of Classification Search
CPC .... G06Q 30/018; G06Q 30/016; G06Q 10/10; G16H 10/40; G16H 10/60; H04L 63/0421; G06F 2201/84; G06F 11/3438
USPC .................................. 705/314, 304; 345/545
See application file for complete search history.

(56) References Cited

U.S. PATENT DOCUMENTS

| | | | | |
|---|---|---|---|---|
| 6,646,655 B1* | 11/2003 | Brandt | ...................... | H04N 5/06 348/E5.011 |
| 7,236,632 B2* | 6/2007 | Erol | .................. | G06F 17/30256 382/218 |
| 7,769,176 B2* | 8/2010 | Watson | .............. | G06Q 20/3674 380/200 |
| 7,774,854 B1* | 8/2010 | Watson | ............... | G06F 21/6209 726/26 |
| 8,401,155 B1* | 3/2013 | Barnes | ..................... | H04M 3/51 370/352 |
| 8,861,707 B2* | 10/2014 | Beckett, II | .......... | H04M 3/5175 379/100.05 |
| 9,185,219 B2* | 11/2015 | Kumar | ................ | H04M 3/5166 |
| 2006/0126817 A1* | 6/2006 | Beckett, II | .......... | H04M 3/5175 379/265.06 |
| 2007/0201675 A1* | 8/2007 | Nourbakhsh | ....... | H04M 3/5175 379/265.01 |
| 2013/0110565 A1* | 5/2013 | Means, Jr. | ............. | G06Q 10/06 705/7.11 |

(Continued)

OTHER PUBLICATIONS

Kendrick, Scott, "10 Keys to PCI Compliance in the Call Center," Engagement Optimization, Apr. 18, 2014, [online], available at: <https://callminer.com/blog/5-keys-pci-compliance-call-center/>. (Year: 2014).*

(Continued)

*Primary Examiner* — Minnah L Seoh
*Assistant Examiner* — Richard W. Crandall

(57) ABSTRACT

A system for providing Payment Card Industry (PCI) compliance for a contact center is disclosed. The system includes a monitoring module configured to monitor a communication session between an agent and a customer. At least one image associated with the agent's computer screen is captured during the communication session. An analysis module is configured to compare the at least one image with at least one predefined image. A control module is configured to control a recording of information associated with the communication session based on the comparison.

11 Claims, 6 Drawing Sheets

(56) References Cited

U.S. PATENT DOCUMENTS

2015/0281436 A1* 10/2015 Kumar ............... H04M 3/5166
379/68

OTHER PUBLICATIONS

PCI and DSS Call Recording, "Why is PCI Compliance such a big issue for contact centres?" [online], archived on Mar. 31, 2014, available at: < https://web.archive.org/web/20140331222918/https://www.callcentrehelper.com/pci-dss-and-call-recording-57184.htm >, last accessed Oct. 31, 2019. (Year: 2014).*

* cited by examiner

SYSTEM AND METHOD FOR PAYMENT CARD INDUSTRY COMPLIANCE

BACKGROUND

Field

Embodiments of the present invention generally relate to a system and method for providing Payment Card Industry (PCI) compliance and particularly to a system and method for providing the PCI compliance using image recognition.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts or work items. Contact centers distribute contacts, whether inbound or outbound, for servicing to any suitable resource according to predefined criteria.

Usually, a contact center has many agents who handle queries from customers. Each agent has an associated agent machine for use of the agent. Each agent machine has recording capability for monitoring service quality of the agent. The agent machine may be a personal computer, a laptop, a palmtop, a mobile device, and the like. The agent machine may include a client screen recording application that continuously records activity of the agent on the client machine. Further, the agent machine may include a client desktop analysis application that monitors in focus screens of applications being used at the agent machine. The agent machine may include a manual recording control application which can be used by the agent to manually pause and resume recording of a communication.

A contact center that handles information related to payment cards needs to comply with PCI regulations. The PCI regulations require sensitive information associated with payment cards to be protected from all internal or external agents. For example, information such as a credit card number must not be recorded or saved by the enterprise while still recording other information being exchanged between the customer and the agent for service quality purposes.

Existing solutions deploy a client application (for example, a manual recording control application) on each agent machine that monitors agent activity on the agent machine and on a call with a customer. The client application can be used to pause and resume recording of a call between the customer and the agent based on a manual trigger from the agent. To comply with the PCI regulations, the agent manually stops recording of the call when the call involves exchange of sensitive information such as a credit card number. The agent may forget to manually pause the recording when the sensitive information is being exchanged. The agent may also forget to resume the recording when exchange of sensitive information is over. Thus, the manual controlling of the information recording is cumbersome. Further, the manual recording is prone to inadequate monitoring of the agent activity and/or PCI regulations violation by the enterprise.

In other existing solutions, a client application (for example, a client desktop analysis application) automatically detects exchange of the sensitive information and triggers a pause to recording of the information as long as information being exchanged remains sensitive. The recording of the information is resumed once the exchange of sensitive information is over. However, if a client application (for example, a client financial application) is modified or replaced; each agent machine also requires updating of the client desktop analysis application. Consequently, even a minor update to the client financial application would require manual updating of the client desktop analysis application at each agent machine. This is a time consuming, error prone and expensive exercise.

There is thus a need for a system and method for improved PCI compliance for a contact center.

SUMMARY

Embodiments in accordance with the present invention provide a system for providing Payment Card Industry (PCI) compliance for a contact center. The system includes a monitoring module configured to monitor a communication session between an agent and a customer. At least one image associated with the agent's computer screen is captured during the communication session. The system further includes an analysis module configured to compare the at least one image with at least one predefined image. The system further includes a control module configured to control a recording of information associated with the communication session based on the comparison.

Embodiments in accordance with the present invention further provide a computer-implemented method for providing PCI compliance for a contact center. The method includes monitoring a communication session between an agent and a customer. At least one image associated with the agent's computer screen is captured during the communication session. The at least one image is compared with at least one predefined image. A recording of information associated with the communication session is controlled based on the comparison.

Embodiments in accordance with the present invention further provide a computer-implemented method for providing PCI compliance for a contact center. The method includes monitoring a communication session between an agent and a customer. At least one image associated with the agent's computer screen is captured during the communication session. The at least one image is compared with at least one predefined image. The at least one image is constructed based on real time data stream received from the agent's computer. A recording of information associated with the communication session is controlled based on the comparison.

Embodiments of the present invention may provide a number of advantages depending on its particular configuration. First, an embodiment of the present application provides a system and a method for providing improved PCI compliance for a contact center. Sensitive information such as credit card numbers is protected. Secondly, the system provides for a centralized monitoring of agent's actions. The centralized monitoring provides for easy deployment and updating of system. Thirdly, the system provides for real time image recognition for providing the PCI compliance for the contact center. Finally, the system is scalable and cost effective for the PCI compliance for the contact center. These and other advantages will be apparent from the present application of the embodiments described herein.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
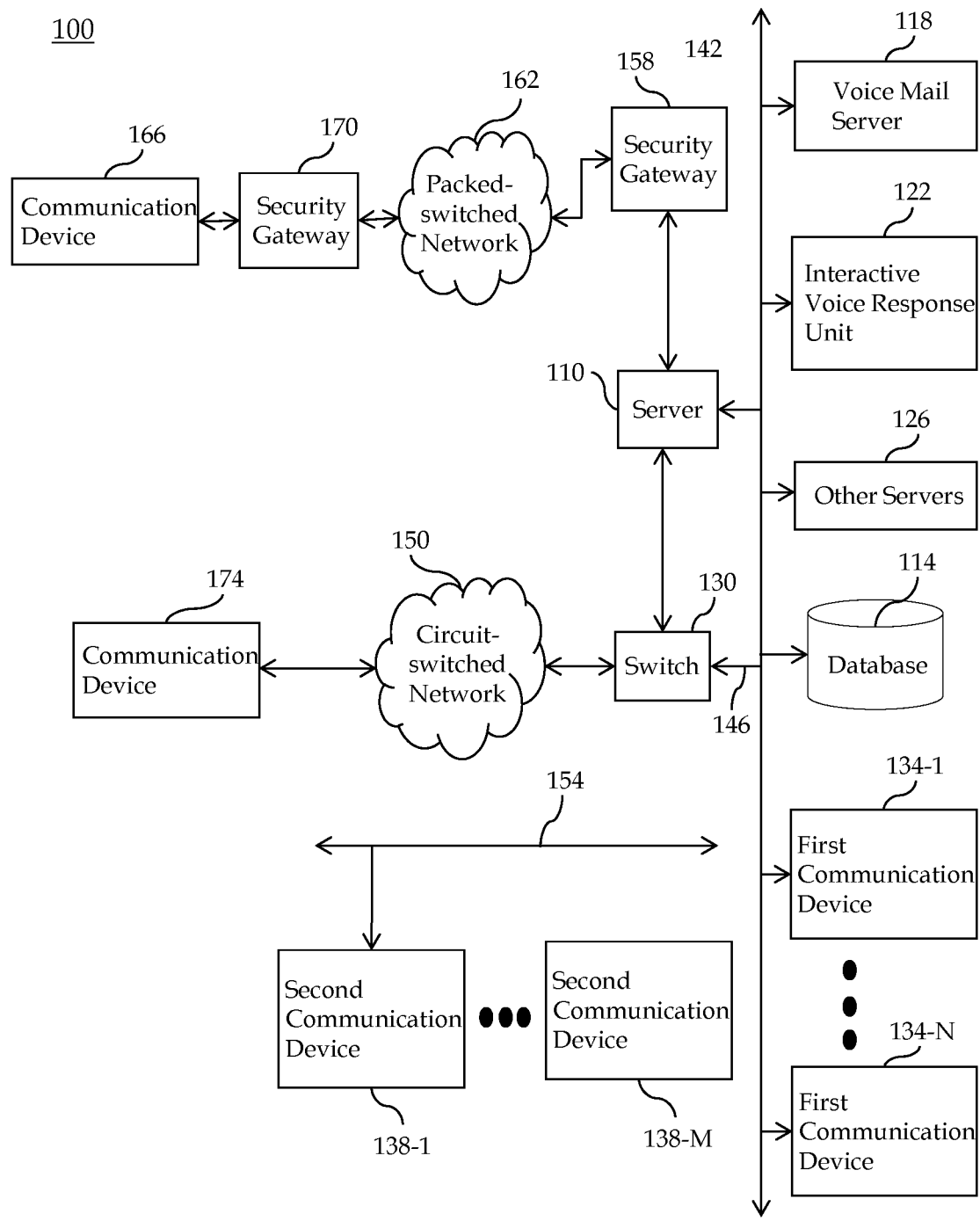
FIG. 1A illustrates a block diagram of a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact (or call) or customer related information, data items, and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In an embodiment of the present invention, the database 114 may store data items associated with the agents of the contact center 100. The data items may include, but is not restricted to, emails, documents, reports, and so forth. The data items may be stored in more than one database of the contact center 114, in another embodiment of the present invention. The database 114 may further store metrics associated with the agents, supervisors, and the data items, in another embodiment of the present invention. Further, the database 114 may also store a rating associated with the data items. Further, the database 114 may store a formula or a mathematical algorithm that may be used to enhance information workflow in the contact center 100.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext1-M, respectively. The second communication devices 138-1-M may include, for example, wired and wireless telephones, PDAs, H.320 video phones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with an external first communication device 166 via a security gateway 170 and the circuit-switched network 150 is in communication with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
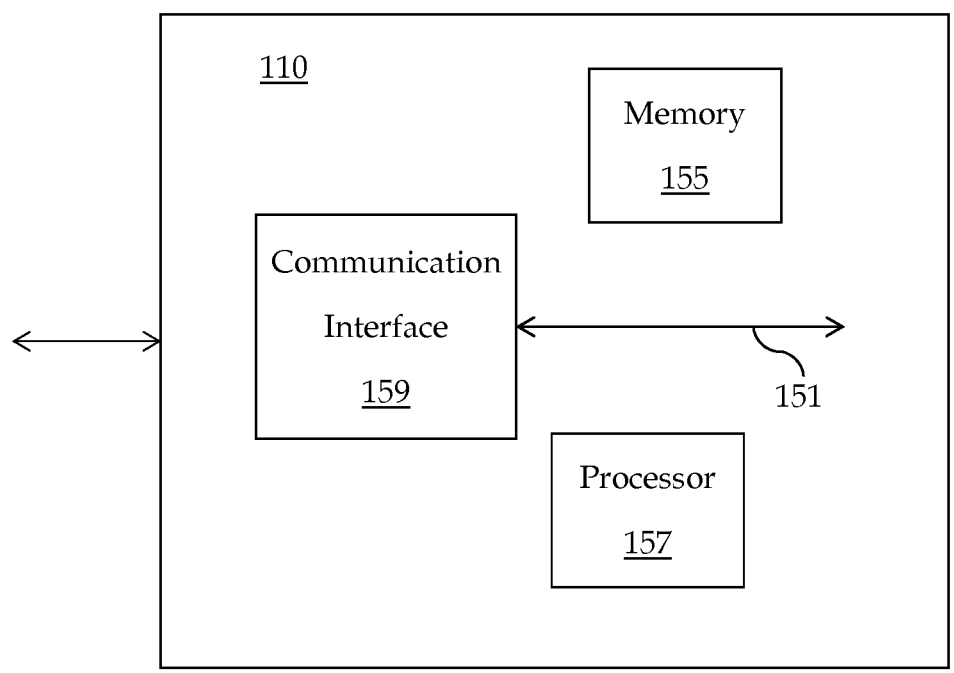
FIG. 1B illustrates at a relatively high level of hardware abstraction a block diagram of a server associated with the contact center, according to an embodiment of the present invention.

FIG. 1B illustrates at a relatively high level of hardware abstraction a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out the various functions of the server 110.

Although embodiments are discussed with reference to client-server architecture, it is to be understood that the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
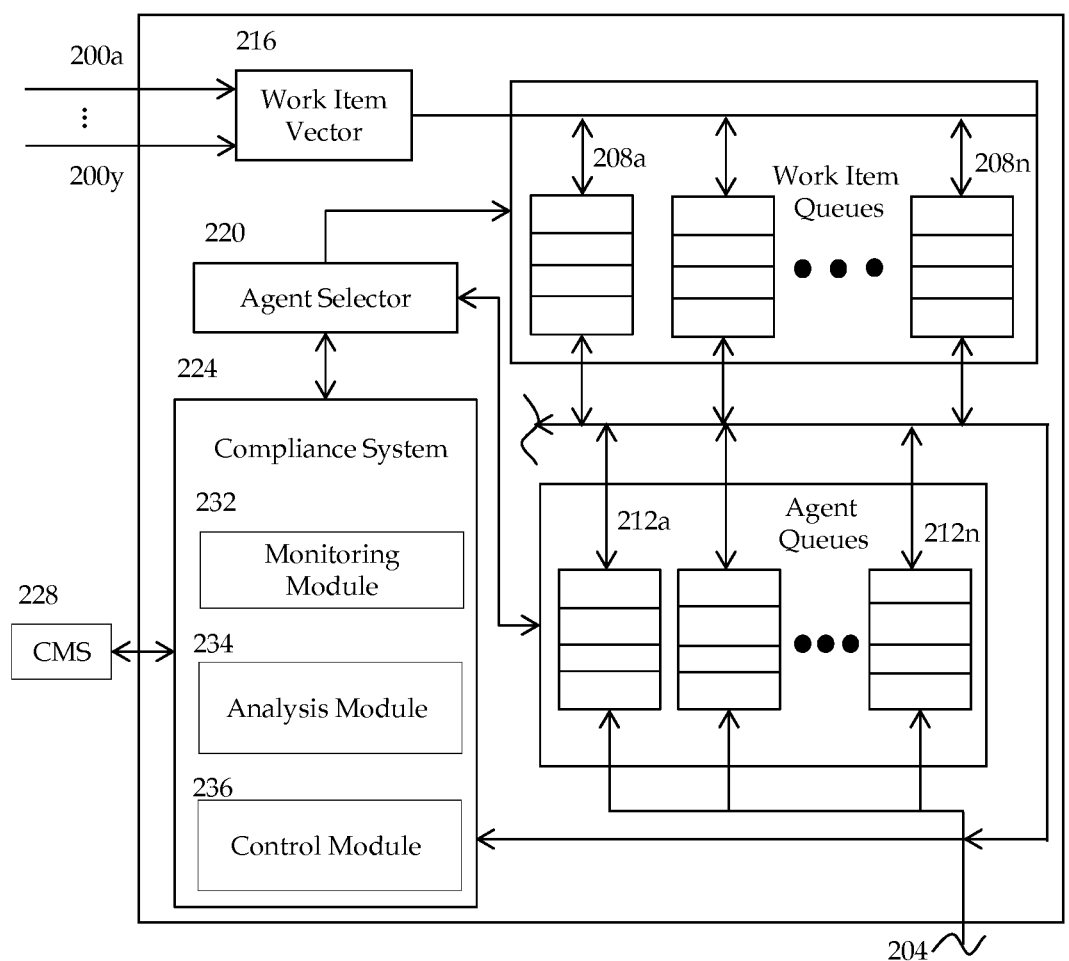
FIG. 2 illustrates a block diagram of a compliance system included in the server of FIG. 1B, according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include Avaya Inc.'s Operational Analyst™ with On-Line Analytical processing, or OLAP technology or a Call Management System or CMS 228 that gathers call records and contact-center statistics for use in generating contact-center reports. OA and CMS will hereinafter be referred to jointly as CMS 228.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector 216. Contacts incoming to the contact center are assigned by work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

According to embodiments of the present invention, included among the programs executing on the server 110 are an agent and work item selector 220 and a compliance system 224. The agent selector 220 and the compliance system 224 are stored either in the main memory or in a peripheral memory (e.g., disk, CD ROM, etc.) or some other computer-readable medium of the contact center 100. The agent selector 220 effects an assignment between available work items (or contacts) and available agents in a way that tends to maximize contact center efficiency for the current contact center state. The agent selector 220 uses predefined criteria in selecting an appropriate agent to service the work item. The selector 220, in particular, obtains, for each of a plurality of contact center goals or objectives, status information, or information respecting whether or not a corresponding goal (for example, the service level agreement) is being met or unmet and/or a level to which the corresponding goal is being met or unmet.

For example, exemplary goal levels can be expressed as actual, average or median wait times in each queue 208, actual, average, or median agent staffing levels in each queue 212, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

The compliance system 224 controls recording of information associated with a communication session between a customer and an agent of the contact center 100. The compliance system 224 is shown inside the server 110 only as illustration. The compliance system may be located outside of the server 110, on a same site as the server 110 or on a remote site. The compliance system 224 is communicably coupled to the server 110. In an embodiment of the present invention, the compliance system 224 includes a monitoring module 232, an analysis module 234, and a control module 236.

The monitoring module 232 is configured to monitor a communication session between a customer and an agent. In one embodiment of the present invention, monitoring includes monitoring keystrokes, mouse movement at the agent's computer. In another embodiment, the monitoring includes video monitoring of the agent's computer screen. In another embodiment, the monitoring includes monitoring of a telephone call, an instant messaging service, a short messaging service, a multimedia messaging service, a screen sharing service, and an interactive voice response service. In another embodiment, the monitoring includes parsing of data exchanged during the communication session. In another embodiment, the monitoring includes receiving data stream from the agent's computer. The data stream may include a video, an audio, an image, or other electronic data.

The monitoring module 232 captures at least one image associated with the agent's computer screen during the communication session. The image may be captured based on a data stream received from the agent's computer. The data stream may include, but not limited to, a video and images. In one embodiment of the present invention, the image is extracted from the video. In one embodiment, every nth frame may be extracted from the video. In another embodiment, the image may be selected from among the received images based on predetermined criteria. The predetermined criteria may include, but not limited to a timing criteria, a numbering criteria. For example, in one embodiment, every nth image may be selected from the received images. In another embodiment, one image may be selected every nth second.

In one embodiment of the present invention, the at least one image is a real time screenshot of the agent's computer screen. In another embodiment, the at least one image is a combination of two or more real time screenshots of the agent's computer screen.

In another embodiment, the monitoring module 232 monitors a plurality of communication sessions associated with the agent. In another embodiment, the monitoring module 232 monitors a plurality of communication sessions each of which is associated with a different agent. In another embodiment, the monitoring module 232 monitors a plurality of communication sessions associated with a plurality of agents. The monitoring module 232 is communicatively coupled to the analysis module 234. The monitoring module provides the at least one image to the analysis module via a communication channel. The communication channel may be any communication channel known in state of the art. The communication channel can be any proprietary or non-proprietary communication channel.

The analysis module 234 compares the captured image received from the monitoring module 232 with a predefined image. In an embodiment of the present invention, the predefined image comprises one or more screenshots of the agent's computer screen. In another embodiment, the predefined image may be a picture of a window or area of the client application that receives sensitive information. The predefined image may be fetched by the analysis module 234 from a data store where it has been stored. In one embodiment of the present invention, the data store comprises a database 114 that is communicatively coupled to the server 110. In another embodiment, the at least one predefined image is stored in a memory location internal to the server 110.

Further, the analysis module 234 may store the captured image and the predefined image in a buffer before performing the comparison. The analysis module 234 may modify either or both of the captured image and the predefined image before performing the comparison. The analysis module 234 may employ any state of the art, proprietary or non-proprietary technique, system, or algorithm to perform the comparison.

The analysis module 234 generates a confidence score based on the comparison. In one embodiment of the present invention, the confidence score may be in a range from 1 to 100. A confidence score of 1 may indicate that the captured image is distinct from the predefined image. On the other hand, a confidence score of 100 may indicate a perfect match between the captured image and the predefined image. However, a scale of 1 to 100 is described only for illustration purposes. Any suitable scale may be employed for determining the confidence score. The confidence score may be determined based on various parameters associated with the captured image and the predefined image. The confidence score may be determined using various methods, algorithms, statistical analysis, image recognition and/or image processing techniques.

The analysis module 234 is communicatively coupled to the control module 236 via a communication channel. The communication channel may be any communication channel known in state of the art. The communication channel can be any proprietary or non-proprietary communication channel. The analysis module 234 provides the confidence score to the control module 236.

The control module 236 controls a recording of information associated with the communication session based on the confidence score. The information associated with the communication session may include data associated with a telephone call, an instant messaging service, a multimedia messaging service, a screen sharing service and/or screen recording video of the agent machine. The control module 236 determined whether the confidence score meets predetermined criteria. In one embodiment of the present invention, the predetermined criterion is expressed as a threshold score. The predetermined criteria may be met when the threshold score is less than, equal to, less than or equal to or greater than, or greater than or equal to the threshold score. In one embodiment, the predetermined criteria are met when the confidence score is greater than or equal to the threshold score.

If the confidence score is less than the threshold score, the information associated with the communication session is recorded. The recording of the information enables maintaining quality of service at the contact center and measuring performance of the agent. The information associated with the communication session may include, but not limited to a telephone call, an instant messaging service, a short messaging service, a multimedia messaging service, a screen sharing service, an interactive voice response service, a video, an audio, an image or other electronic data. The information may be recorded in a data store such as database 114 for service quality purposes.

If the confidence score is greater than or equal to the threshold score, the recording of the information associated with the communication session is paused. In one embodiment of the present invention, the pausing may include receiving the data but masking it. In one embodiment of the present invention, the threshold score is a percentage/fraction of scale employed to measure the confidence score. In another embodiment, the threshold score is determined based on the scale of the confidence score using statistical methods. In one embodiment of the present invention, the threshold score is in a range from about 70 to about 90 on a scale from 1 to 100.

The predetermined threshold score may vary according to the type of client applications installed on the agent's computer. In one embodiment of the present invention, the predetermined threshold score may vary with the at least one predefined image. For example, the predetermined threshold score may vary based on number and configuration of objects in the at least one predefined image.

In another embodiment, the predetermined criteria may be based on statistical modeling, correlation analysis or other statistical criteria.

The embodiments of the present invention provide improved PCI compliance for a contact center. The embodiments of the present invention provide centralized and automatic controlling of recording of information for various communication sessions between customers and agents of the contact center. Thus, system and method according to present invention provides for adherence to PCI regulations while being cost effective and easy to manage.

Figure 3A:
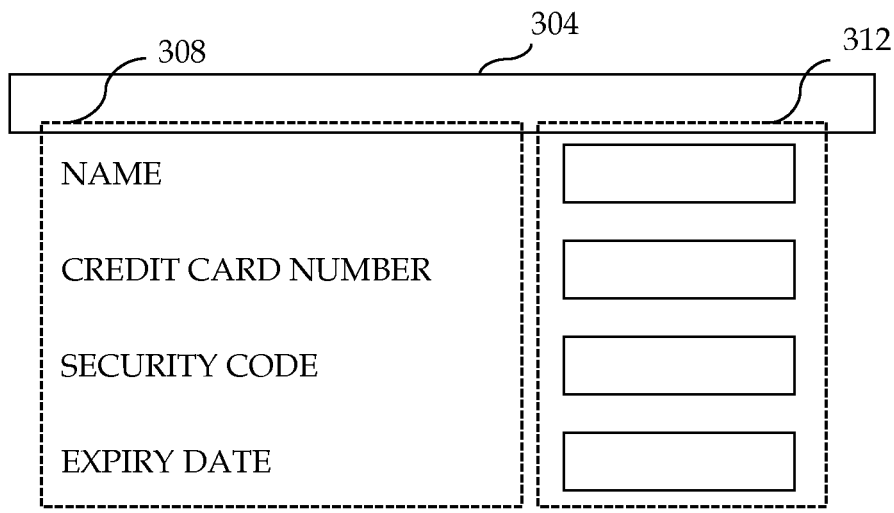
FIG. 3A illustrates an exemplary predefined image, according to an embodiment of the present invention.
Figure 3B:
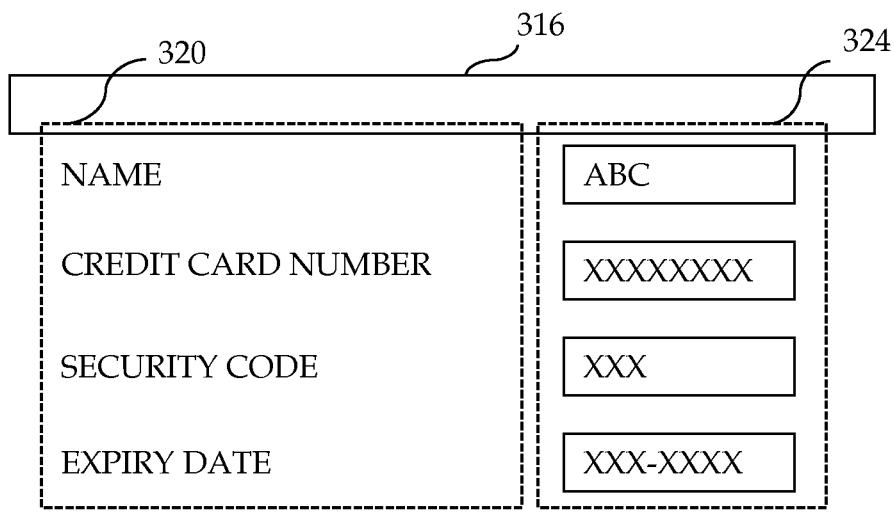
FIG. 3B illustrates an exemplary real time screen shot of an agent's computer screen, according to an embodiment of the present invention.

FIGS. 3A and 3B illustrate with a block diagram 300, exemplary predefined image 304 and captured image 316 associated with the agent's computer. The image 304, in an embodiment of the present invention, comprises a predefined image. The image 304 includes a plurality of named fields 308 including, but not limited to, a name, a credit card number, a security code, and an expiry date. In one embodiment of the present invention, the plurality of named fields 308 includes at least one sensitive named field. For the purposes of this specification, a sensitive named field includes any named field associated with sensitive information. The image 304 further includes a plurality of blank input fields 312. The plurality of blank input fields 312 correspond to the plurality of named fields 308, for example, the blank input field shown against the credit card number receives input corresponding to the credit card number. In an embodiment of the present invention, the image 304 comprises one or more screenshots of an agent's computer screen.

The image 316 comprises of a real time screenshot of an agent's computer screen. As is seen from the FIG. 3B, the image 316 comprises a plurality of named fields 320 and a plurality of filled or partially filled input areas 324.

In an exemplary embodiment of the present invention, the predefined image 304 is compared with the captured image 316 to determine a confidence score. Based on the confidence score, recording of the information for the communication session between the customer and the agent is controlled. The detailed methods of controlling the recording and associated advantages are further explained in relation to FIG. 5 below.

Figure 4:
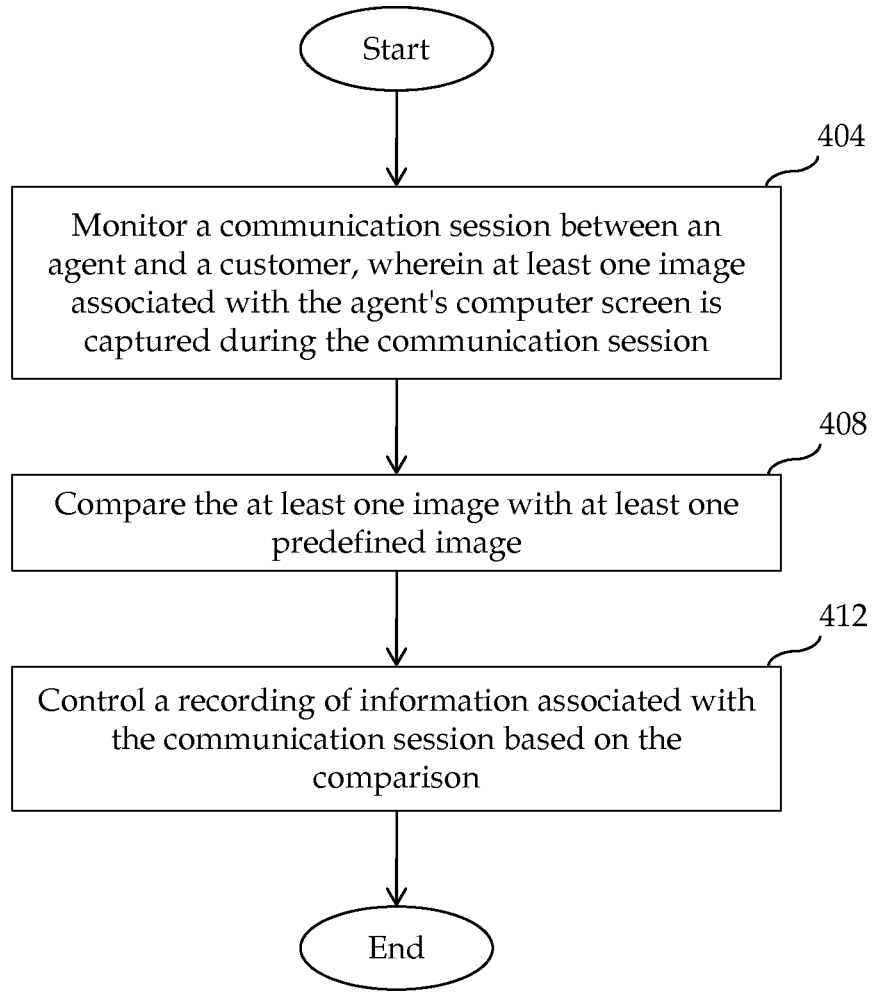
FIG. 4 is a flowchart of a method for providing the PCI compliance, according to an embodiment of the present invention.

FIG. 4 depicts a flowchart of a method 400 for controlling recording of information for a contact center, according to an embodiment of the present invention.

At step 404, a communication session between a customer and an agent of the contact center is monitored. In one embodiment of the present invention, monitoring includes monitoring keystrokes, mouse movement at the agent's computer. In another embodiment, the monitoring includes video monitoring of the agent's computer screen. In another embodiment, the monitoring includes monitoring of a a telephone call, an instant messaging service, a short messaging service, a multimedia messaging service, a screen sharing service, and an interactive voice response service. In another embodiment, the monitoring includes parsing of data exchanged during the communication session. In another embodiment, the monitoring includes receiving data stream from the agent's computer. The data stream may include a video, an audio, an image, or other electronic data.

At least one image associated with the agent's computer screen is captured during the communication session. The at least one image may be in any known proprietary or non-proprietary format.

At step 408, the captured image is compared to a predefined image. The predefined image may include one or more screenshots of the agent's machine. The predefined image may be in any known proprietary or non-proprietary format. In one embodiment, the predefined image is in a format different from the format of the captured image. In another embodiment, the format of the predefined image is changed to the format of the captured image.

At step 412, recording of the information associated with the communication session is controlled based on the comparison. In one embodiment of the present invention, the controlling includes, but not limited to recording, pausing the recording, masking the recorded information, discarding the received information. The controlling of the recording may be based on predetermined criteria. The controlling of the recording of the information provides improved PCI compliance for a contact center. The embodiments of the present invention provide centralized and automatic controlling of recording of information for various communication sessions between customers and agents of the contact center. Thus, system and method according to present invention provides for adherence to PCI regulations while being cost effective and easy to manage.

Figure 5:
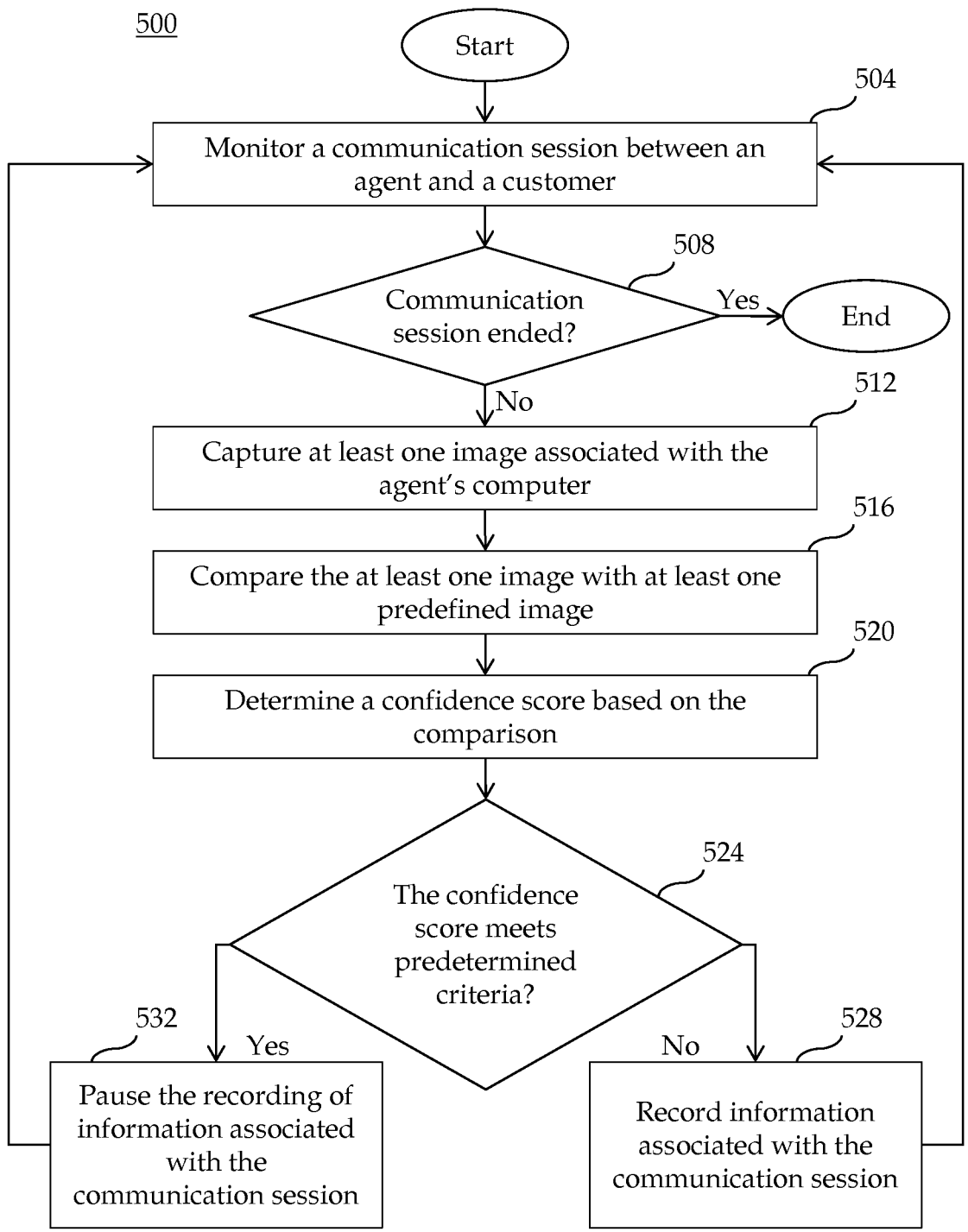
FIG. 5 is a flowchart of a detailed method for providing the PCI compliance, according to an embodiment of the present invention.

FIG. 5 depicts a detailed flowchart of a method 500 for controlling recording of information for a contact center, according to an embodiment of the present invention.

At step 504, a communication session between a customer and an agent of is monitored. In one embodiment of the present invention, monitoring includes monitoring keystrokes, mouse movement at the agent's computer. In another embodiment, the monitoring includes video monitoring of the agent's computer screen. In another embodiment, the monitoring includes monitoring of a a telephone call, an instant messaging service, a short messaging service, a multimedia messaging service, a screen sharing service, and an interactive voice response service. In another embodiment, the monitoring includes parsing of data exchanged during the communication session. In another embodiment, the monitoring includes receiving data stream from the agent's computer. The data stream may include a video, an audio, an image, or other electronic data.

At step 508, it is determined whether the communication session between the customer and the agent has ended. The communication session may be ended by the customer, the agent, or due to technical problem such as power shutdown or an application not working. If the communication session has ended at step 508, the method 500 ends. If the communication session has not ended, then the method 500 proceeds to step 512.

At step 512, an image associated with an agent's computer screen is captured. The image may be captured by based on a data stream received from the agent's computer. The data stream may include, but not limited to, a video and one or more images. In one embodiment of the present invention, the image is extracted from the video. In one embodiment, every nth frame may be extracted from the video. In another embodiment, the image may be selected from among the received images based on predetermined criteria. The predetermined criteria may include, but not limited to a timing criteria, a numbering criteria. For example, in one embodiment, every nth image may be selected from the received images. In another embodiment, one image may be selected every nth second.

In one embodiment of the present invention, the at least one image is a real time screenshot of the agent's computer screen. In another embodiment, the at least one image is a combination of two or more real time screenshots of the agent's computer screen. In another embodiment, a plurality of communication sessions associated with the agent is monitored. In another embodiment, a plurality of communication sessions each of which is associated with a different agent is monitored. In another embodiment, a plurality of communication sessions associated with a plurality of agents is monitored.

At step 516, the captured image is compared with a predefined image. In an embodiment of the present invention, the predefined image comprises one or more screenshots of the agent's computer screen. In another embodiment, the at least one predefined image may be a picture of a window or area of the client application that receives sensitive information. The predefined image may be fetched from a data store where it has been stored. In one embodiment of the present invention, the data store may be database 114 that is communicatively coupled to the server 110. In another embodiment, the predefined image is stored in a memory location internal to the server 110.

Further, the captured image and the predefined image may be stored in a buffer before performing the comparison. In an embodiment of the present invention, either or both of the captured image and the predefined image may be modified before performing the comparison. Any state of the art, proprietary or non-proprietary technique, system, method or algorithm may be employed to perform the comparison.

At step 520, a confidence score is determined based on the comparison of the captured image with the predefined image. In one embodiment of the present invention, the confidence score may be in a range from 1 to 100. A confidence score of 1 may indicate that the captured image is distinct from the predefined image. On the other hand, a confidence score of 100 may indicate a perfect match between the captured image and the predefined image. However, a scale of 1 to 100 is described only for illustration purposes. Any suitable scale may be employed for determining the confidence score. The confidence score may be determined based on various parameters associated with the captured image and the predefined image. The confidence score may be determined using various methods, algorithms, statistical analysis, image recognition and/or image processing techniques.

At step 524, it is determined whether the confidence score meets predetermined criteria. In one embodiment of the present invention, the predetermined criteria a threshold score. The predetermined criteria may be met when the threshold score is less than, equal to, less than or equal to or greater than, or greater than or equal to threshold score. In one embodiment, the predetermined criteria are met when the confidence score is greater than or equal to the threshold score. In this embodiment, if the confidence score is less than the threshold score, the method 500 proceeds to step 528.

At step 528, the information associated with the communication session is recorded. The recording of the information enables maintaining quality of service at the contact center and measuring performance of the agent. The information associated with the communication session may include, but not limited to a telephone call, an instant messaging service, a short messaging service, a multimedia messaging service, a screen sharing service, an interactive voice response service, a video, an audio, an image or other electronic data. The information may be recorded in a data store such as database 114 for service quality purposes. At this stage, the method 500 loop back to step 504, at which the monitoring of the communication session is continued in real time.

If the confidence score is greater than or equal to the threshold score, the method proceeds to step 532.

At step 532, the recording of the information associated with the communication session is paused. In one embodiment of the present invention, the pausing may include receiving the data but masking it. At this stage, the method 500 loop back to step 504, at which the monitoring of the communication session is continued in real time.

In one embodiment of the present invention, the threshold score is a percentage/fraction of scale employed to measure the confidence score. In another embodiment, the threshold score is determined based on the scale of the confidence score using statistical methods. In one embodiment of the present invention, the threshold score is in a range from about 70 to about 90 on a scale from 1 to 100.

The predetermined threshold score may vary according to the type of client applications installed on the agent's computer. In one embodiment of the present invention, the predetermined threshold score may vary with the at least one predefined image. For example, the predetermined threshold score may vary based on number and configuration of objects in the at least one predefined image.

In another embodiment, the predetermined criteria may be based on statistical modeling, correlation analysis or other statistical criteria.

The embodiments of the present invention provide improved PCI compliance for a contact center. The embodiments of the present invention provide centralized and automatic controlling of recording of information for various communication sessions between customers and agents of the contact center. Thus, system and method according to present invention provides for adherence to PCI regulations while being cost effective and easy to manage.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A server comprising a compliance system for a contact center, the server comprising a processor and a memory, wherein the processor executes programming code stored in the memory to:
    monitor an ongoing communication session between an agent and a customer;
    receive, from a computer of the agent, a video data stream of a screen of the computer of the agent during the monitored ongoing communication session;

extract a first image from the received video data stream, wherein the first image is extracted from a periodic subset of frames of the received video data stream;

retrieve a stored predefined image, wherein the stored predefined image comprises at least one field associated with sensitive data to avoid recording;

compare the first image with the predefined image that comprises at least one field associated with sensitive data to avoid recording;

generate a first confidence score based on the comparison of the first image with the predefined image; and selectively perform:
  a) recording of information associated with the ongoing communication session when the first confidence score is less than a threshold value; and
  b) pause recording of information associated with the ongoing communication session when the first confidence score is greater than or equal to the threshold value.

2. The system of claim 1, wherein the processor executes programming code stored in the memory to:

subsequent to extracting the first image, determine the ongoing communication session has not ended and extract a second image from the received video data stream, wherein the second image is extracted from the periodic subset of frames of the received video data stream;

compare the second image with the predefined image;

generate a second confidence score based on the comparison of the second image with the predefined image; and resume recording of information associated with the ongoing communication session based on the second confidence score being less than the threshold value.

3. The system of claim 1, wherein pausing recording of information associated with the ongoing communication comprises masking the sensitive data.

4. The system of claim 1, wherein the information associated with the ongoing communication session comprises data associated with at least one of a telephone call, a video conference, an instant messaging service, a short messaging service, a multimedia messaging service, a screen sharing service, or an interactive voice response service.

5. The system of claim 1, wherein the predefined image comprises a one or more screenshots of the agent's computer screen.

6. A computer-implemented method in a contact center, the method comprising:

monitoring, by a server, an ongoing communication session between an agent and a customer;

receiving, by the server, from a computer of the agent, a video data stream of a screen of the computer of the agent during the monitored ongoing communication session;

extracting, by the server, a first image from the received video data stream, wherein the first image is extracted from a periodic subset of frames of the received video data stream;

retrieving, by the computer, a stored predefined image, wherein the stored predefined image comprises at least one field associated with sensitive data to avoid recording;

comparing, by the server, the first image with the predefined image that comprises at least one field associated with sensitive data to avoid recording;

generating, by the server, a first confidence score based on the comparison of the first image with the predefined image; and based on the first confidence score being greater than or equal to a threshold value, pausing, by the server, recording of information associated with the ongoing communication session.

7. The method of claim 6, comprising:

subsequent to extracting the first image, determining, by the server, the ongoing communication session has not ended and extracting, by the server, a second image from the received video data stream, wherein the second image is extracted from the periodic subset of frames of the received video data stream;

comparing, by the server, the second image with the predefined image;

generating, by the server, a second confidence score based on the comparison of the second image with the predefined image; and resuming, by the server, recording of information associated with the ongoing communication session based on the second confidence score being less than the threshold value.

8. The method of claim 6, wherein the pausing comprises one of a masking of the sensitive data or a shedding of the sensitive data.

9. The method of claim 6, wherein the predefined image comprises a screenshot of a client application that receives the sensitive information.

10. The method of claim 9, wherein the screenshot comprises a plurality of named fields and a plurality of corresponding input areas.

11. The method of claim 6, wherein the at least one field comprises at least one of a customer name, a credit card number, a card security number or an expiry date.

* * * * *